United States Patent Office 3,806,491
Patented Apr. 23, 1974

3,806,491
FOUNDRY BINDER COMPOSITION COMPRISING A KETONE-ALDEHYDE PRODUCT
John J. Gardikes, Worthington, and Young D. Kim, North Royalton, Ohio, assignors to Ashland Oil, Inc., Ashland, Ky.
No Drawing. Filed Nov. 17, 1972, Ser. No. 307,720
Int. Cl. C08f 45/04
U.S. Cl. 260—42.43                    10 Claims

ABSTRACT OF THE DISCLOSURE

A binder composition suitable for foundry aggregates is obtained from certain ketone-aldehyde reaction products and furfuryl alcohol and/or furan resin.

BACKGROUND OF THE INVENTION

The present invention relates to binder compositions and methods for curing such binder compositions. In particular, the present invention relates to binder compositions useful in the foundry art for making cores and molds which harden at room temperature.

In the foundry art, cores and molds for use in making metal castings are commonly prepared from mixtures of an aggregate material, such as sand, which has been combined with a binding amount of a polymerizable or curable binder. Frequently, minor amounts of other materials are also included in these mixtures, e.g., iron oxide, ground flax fibers, powdered coal, clay, and the like. The binder permits such a foundry mix to be molded or shaped into the desired form and thereafter cured to form a self-supporting structure.

Typically, sand is used as the aggregate material. After the sand and binder have been mixed, the resulting foundry sand mix is rammed, blown, or otherwise introduced into a pattern, thereby assuming the shape defined by the adjacent surfaces of the pattern. Then by use of catalyst (e.g., ammonium chloride) and/or the use of heat, the polymerizable binder is caused to polymerize, thereby converting the form, uncured, plastic, foundry sand mix into a hard, solid, cured state. This hardening can be accomplished in the original pattern or in a holding pattern.

Certain of the prior art processes are quite effective. Unfortunately, the use of core binders (e.g., "hot box binders") which are cured by being subjected to elevated temperatures, e.g., from 225° F. to about 500° F. requires that heating facilities be available. Frequently, it is necessary to keep the green cores in the original molds or patterns during this heating period since many heat curable binders (e.g., core oils) do not impart sufficient green strength to cause green cores to retain their desired shape without extenral support until such time as a final cure can be effected. Likewise, binders which are cured by means of gaseous catalysts often require that gasing chambers be available. Additionally, many of the binders which can be gas cured suffer from the same green strength or stripping strength deficiencies as do the heat curable binders.

In an effort to prepare cores without the necessity for using heat, gaseous catalysts, and the like, various prior attempts have been made to prepare binders which would be capable of curing at room temperature, i.e., at temperatures of from about 45°–120° F., more usually about 60°–90° F. A variety of materials have been developed or suggested for use as binders, but these prior art compositions have suffered from one or more deficiencies. Typical of the deficiencies exhibited by prior art binders alleged to cure at room temperature have been a lack of ability to rapidly impart green strength or stripping strength to cores, a lack of tensile strength, intolerably short bench life of foundry mixes, high toxicity, inability to combine well with all foundry aggregates, high sensitivity to moisture, contamination of the surface of castings, and the creation of pin-holes in castings. In spite of their recognized shortcomings, certain of these room temperature curing binders are widely employed. In addition, various prior art binders are relatively expensive.

It is therefore an object of the present invention to provide foundry binder compositions capable of curing without heating. It is still another object of the present invention to provide a process for producing cores and other foundry shapes from foundry mixes incorporating the binder compositions of the present invention.

SUMMARY OF THE INVENTION

The present invention is concerned with composition for the fabrication of foundry cores and molds which comprises:

(1) a major amount of foundry aggregate;
(2) an effective bonding amount up to about 10% by weight based on the weight of the aggregate of a binder system containing about 90 to about 20% by weight of a reaction product of solid paraformaldehyde and a ketone selected from the group of ketones having the following formula:

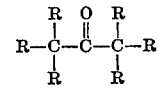

wherein each R individually is selected from the group of hydrogen, alkyl of 1 to 8 carbon atoms, aryl of 6 to 14 carbon atoms, and cycloalkyl of 3 to 8 carbon atoms, provided that at least 2 R's are hydrogen; cyclohexane, and cyclopentanone, the mole ratio of the paraformaldehyde to ketone being about 1:1 to 7:1; and from about 10 to about 80% by weight of furfuryl alcohol and/or furan polymer; or a binder system containing a reaction product of about 90 to about 20% by weight of a mixture of solid paraformaldehyde and a ketone as defined above, the mole ratio of the paraformaldehyde to ketone is about 1:1 to 7:1 in the presence of from about 10 to 80% by weight of furfuryl alcohol and/or furan polymer. The present invention is also concerned with a foundry process which comprises mixing foundry sand with a binding amount of up to about 10% by weight based on the composition of the above described binder system to thereby form a foundry mix.

DESCRIPTION OF PREFERRED EMBODIMENTS

The aggregates which may be employed in the present invention are those commonly employed in preparing foundry structures such as sand. The aggregate constitutes the major constituent and the binder portion constitutes a relatively minor amount, generally less than about 10% by weight and frequently within the range of about 0.25 to about 5% by weight, based on the weight of the aggregate. Most often, the binder content ranges from about 1–3% based upon the weight of the aggregate. Although the aggregate employed is preferably dry, generally moisture of up to about 1% by weight on the weight of the aggregate can be tolerated.

The binder system employed in the present invention is obtained from paraformaldehyde, a ketone, and a furfuryl alcohol and/or furan resin. The paraformaldehyde and ketone can be prereacted and then admixed with the furfuryl alcohol and/or furan resin. In addition, the paraformaldehyde and ketone can be reacted in the presence of all or a portion of the furfuryl alcohol and/or furan resin if desired.

Paraformaldehyde is a substantially water-free source of formaldehyde and is a mixture of polyoxymethylene glycols which usually contains from about 90 to about 99% by weight of formaldehyde with the balance consisting principally of free and combined water. It is recognized, of course, that paraformaldehyde can include mixtures of polyoxymethylene glycols containing down to about 80% formaldehyde with the balance consisting principally of free and combined water, as long as the mixture is still a solid material. Usually, commercial grades of paraformaldehyde contain from about 91 to about 98% formaldehyde. The chemical composition of paraformaldehyde can be expressed by the following formula:

wherein $n$ is equal to 8 to 100. Normally, the majority of the polyoxymethylene glycols in paraformaldehyde contain over about 12 formaldehyde units per molecule. Paraformaldehyde has a melting point of from about 120 to about 170° C.

The ketones which can be employed in the present invention include cyclohexanone, cyclopentanone, and those represented by the following formula:

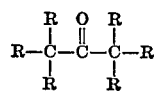

Each R individually is selected from the group of hydrogen, alkyl group of from one to about 8 carbon atoms, aryl group of from 6 to 14 carbon atoms, and cycloalkyl group of 3 to 8 carbon atoms, provided that at least 2 R's are hydrogen.

Some examples of suitable alkyl groups include methyl, ethyl, propyl, n-butyl, pentyl, hexyl, and octyl. Examples of suitable aryl groups include phenyl and napthyl. Some examples of cycloalkyl groups are cyclopropyl, cyclobutyl, cyclopentyl and cyclohexyl. Some examples of ketones of the above formula which can be employed in the present invention include acetone, methylethyl ketone, methyl propyl ketone. The preferred ketone is acetone.

The relative mole ratios of paraformaldehyde to ketone employed in the present invention range from about 7:1 to 1:1. The preferred mole ratios being about 1.2:1 to about 3.0:1. Polymers produced from the preferred mole ratios contain practically no formaldehyde odor. Usually the moles of formaldehyde per mole of ketone employed is no greater than the number of R groups of the ketone which are hydrogen.

The reaction between the ketone and paraformaldehyde is carried out under alkaline conditions at a pH of from about 8 to about 11.5 and preferably from about 9 to about 11.

Examples of some suitable catalysts include alkali metal salts of phenolic material such as the sodium, potassium, or lithium salts of phenol, of the cresols and of the xylenols as well as of the tertiary amyl phenols, of the phenyl phenols and of the phenols of diphenyl, naphthalene, anthracene, etc. In addition, the alkali metal salts of catechol, hydroquinone, and resorcinol are suitable for catalysts in preparing the condensation products employed in the present invention.

Some other examples of suitable catalysts include the oxides, peroxides and hydroxides of the alkali metals and of the alkaline earths as well as the salts of these elements with acids such as carbonic, boric, phosphorous acid, and phosphoric acid.

As an indication of the large number of possible alkaline catalysts, it may be stated that in the case of a single alkali metal such as sodium, we may use any of the following: sodium in metallic state, sodium oxide, sodium peroxide, sodium hydroxide, sodium carbonate, sodium bicarbonate, sodium borate, trisodium phosphate, sodium methoxide, sodium ethoxide, and sodium phenate.

The preferred catalysts are the alkali metal salts of phenolic materials and particularly of phenol.

The alkali metal salt of the phenol can be formed in situ in the reaction media. For instance sodium phenate is conveniently formed from in situ from NaOH and phenol. The salts of the phenolic materials may suppress the cannizarro side reaction due to the presence of phenol. Also, these preferred catalysts make it possible to control the reaction.

The amount of catalyst employed can vary over a wide range so long as the pH of the reaction mixture is within the range of about 8 to about 11.5. The amount of catalyst should not be so high as to render the reaction uncontrollable due to the reaction exotherm. This amount of course will depend upon the capacity of the reaction medium and/or reaction equipment to remove the heat of reaction. Also, the reaction mixture may contain auxiliary materials such as phenol, which buffers the reaction mixture to the desired pH.

The reaction can be carried out under subatmospheric, atmospheric or superatmospheric pressure. Atmospheric pressure is generally preferred. The reaction is preferably carried out below the reflux temperature of the ketone to readily control the reaction. However, higher temperatures can be employed so long as the reaction system is capable of removing the exothermic heat of reaction, for instance, the reaction may contain materials other than the ketone and paraformaldehyde such as phenol and furfuryl alcohol which act as heat sinks.

In addition, the ketone and formaldehyde can be reacted in the presence of modifying reactants such as phenols and amides. In particular, phenol and/or urea can be employed in the reaction. Generally the amount of such modifying reactants can be up to about 100 mole percent of the ketone, and preferably is between about 5 and 50 mole percent of the ketone.

The reaction can be carried out by adding all of the reaction material at the beginning of the reaction or by the sequential addition of one or more of the constituents employed in the reaction. In particular, it is desirable to either add the catalyst or the paraformaldehyde in two or more stages.

The reaction is normally terminated when the reaction media has a Gardner-Holdt viscosity of E–H and/or a water tolerance of about 150 to about 250% depending on which of these parameters is achieved first. After the reaction, the reaction mixture is neutralized to a pH range of about 6.0 to about 7.5 by the addition of an acid such as formic acid, acetic acid, and phosphoric acid. The polymer is then usually subjected to vacuum distillation in order to remove any water and/or other volatile constituents. The vacuum distillation is normally carried out at a temperature no higher than about 90° C. In addition, the polymer can be subjected to distillation at atmospheric pressure employing higher temperatures such as 125° C. if desired. After the distillation, the polymer generally has a Gardner-Holdt viscosity of at least T. Many of the polymers of the present invention have Gardner-Holdt viscosities greater than Z.

One particular advantage in the use of the paraformaldehyde is that the dehydration of the polymer is relatively facile as compared to that of a polymer formed from other sources of formaldehyde such as formalin. The ketone-formaldehyde polymer is prepared in a substantially non-aqueous media.

The other component of the binder system is furfuryl alcohol and/or furan resin. The furfuryl alcohol and/or furan resin can simply be admixed with the ketone-paraformaldehyde reaction product or can be added to the ketone and paraformaldehyde during the preparation of the ketone-formaldehyde polymer. Of course, a portion of the furfuryl alcohol and/or the furan resin can be added during the preparation of the ketone-paraformaldehyde reaction product and the remainder can be added to the reaction product.

The furan polymers include reaction products of furfuryl alcohol and of aldehydes such as formaldehyde. In addition, the aldehyde-furfuryl alcohol reaction products can be modified with varying amounts of reactants such as phenol and urea. However, it is preferred that the furan polymer as well as the entire binder mixture, be free of nitrogen containing materials.

The addition of nitrogen-containing compounds, such as urea, to the binder system is believed to be a cause of some defects that have been noted in metal castings, particularly steel castings. Although not wishing to be bound by any particular theory, it appears that the molten metal which is poured against the sand mold causes these nitrogen-containing compounds to decompose to form nitrogen gas. If this nitrogen gas is absorbed or trapped in the molten metal, a defect occurs in the metal casting which is sometimes referred to as "pin hole porosity."

The mole ratios of formaldehyde to furfuryl which can be employed can vary widely. For instance, the furan polymer can be prepared from about 0.4 to about 4 moles of furfuryl alcohol per mole of formaldehyde, and preferably from about 0.5 to about 2 moles of furfuryl alcohol per mole of formaldehyde.

The furan polymer which can be employed in the present invention can be any of the various furan polymers which are known to be suitable for foundry purposes. Examples of such furan polymers include those obtained from about one mole of phenol, about 0.2 to 2 moles of furfuryl alcohol and about 1 to 3 moles of formaldehyde such as described in U.S. Pat. No. 3,312,650. In addition, U.S. Pat. Nos. 3,222,315 and 3,247,556 describe various urea modified furan resins which can be employed for the purposes of this invention, but which are not particularly preferred since they tend to cause pin holding. The furan polymers are generally prepared by polymerization in the presence of an acid catalyst.

The preferred furan resins are those prepared according to the procedure described in Australian Pat. No. 423,636, disclosure of which is incorporated herein by reference. These furan resins are prepared by partially polymerizing formaldehyde and furfuryl alcohol in the presence of an acid catalyst, arresting the polymerization at an intermediate stage by neutralizing the acid catalyst to thereby form a furan prepolymer, and thereafter heating the prepolymer thus obtained in the presence of a metal ion catalyst.

In particular, furfuryl alcohol, formaldehyde (e.g. as formalin or paraformaldehyde), and an inert organic solvent (e.g. xylene) are charged to a reaction vessel. Then, the acid catalyst (e.g., phosphoric acid and paratoluene sulphonic acid) is added to the reaction vessel and the resulting mixture is heated under reflux conditions and maintained under those conditions until the reaction has proceeded to the desired degree of polymerization. The water of reaction and any water present with any of the reactants is removed during polymerization, usually through a trap on the reflux condenser. The degree of polymerization can be followed by measuring the amount of water removed or by measuring the viscosity, refractive index, free formaldehyde content, and pH of the reaction mixture. When the desired degree of polymerization has been obtained, the acid catalyst will be neutralized to halt further polymerization and a metal ion catalyst (e.g., lead oxide) will be added to the prepolymer, after which it will be heated to distill out the organic solvent and to destroy the residual free formaldehyde. It has been noted that when the prepolymer is heated at a uniform rate (e.g., 1°–3° F. per minute) in the presence of a metal ion catalyst, a point is reached (e.g., about 270° F.) when the temperature will spontaneously increase at a more rapid rate because of the extra heat being supplied to the system by the destruction of the residual free formaldehyde (which is an exothermic reaction). The prepolymer can then be cooled. Usually an alkaline material is added to adjust the pH of the polymer to about 6 to about 7.5.

These furan prepolymers can be prepared in the presence of monomers which are copolymerizable with formaldehyde and furfuryl alcohol, such as phenol.

Formaldehyde can be used in any of its various forms, (e.g., formalin, trioxane, and paraformaldehyde). The use of paraformaldehyde is preferred. If paraformaldehyde is used as the source of formaldehyde, it is frequently necessary to provide sufficient acidity to the reaction mixture to dissolve the paraformaldehyde since, under neutral conditions, paraformaldehyde is insoluble in many organic solvents.

Improved results (in terms of end use performance) are obtained if the presence of water in the finished furan prepolymer is minimized or avoided. Accordingly, the use of formalin (which contains a significant amount of water) should be avoided where possible.

By using a substantially water-free source of formaldehyde (e.g. paraformaldehyde) and by performing the polymerization reaction in an inert solvent boiling above 100° C. (e.g. as by the use of xylene) higher reaction temperatures can be reached and water can be quickly and effectively removed. With the preferred form of the present process, water contents of the prepolymer are typically less than 1% based on the weight of the final product.

The reaction conditions which can be used to form the furan prepolymers are those conditions of temperature and pressure which favor the acid catalyzed polymerization of furfuryl alcohol with formaldehyde. The choice of suitable conditions of temperature and pressure, as well as the choice of a suitable acid catalyst, are all acts within the skill of the art. Thus, pressure can be subatmospsheric, atmospheric or super-atmospheric. Atmospheric pressure is generally acceptable. Temperature can vary widely, although reaction temperatures above 100° C. are preferred because of the desirable reaction rates which are obtained and the lowed water contents which result from the use of higher temperatures.

The mole ratios of formaldehyde to furfuryl alcohol which can be employed can vary widely. Good results have been obtained using from 0.6–1.6 moles of formaldehyde per mole of furfuryl alcohol. A particularly useful group of prepolymers can be made by using a mole ratio of formaldehyde to furfuryl alcohol of from 0.9–1.2 moles of formaldehyde per mole of furfuryl alcohol.

Suitable metal ion catalysts include the basic salts and oxides of the various metals. Of the polyvalent metal ion catalysts, the divalent metallic ions are preferred. Zinc and lead ions are especially preferred. Catalyst concentrations can vary as shown by the examples. Typically, the catalysts (i.e. compounds of these metallic ions) will be used at levels of 0.1–0.5% based on the weight of furfuryl alcohol. Illustrative catalysts include:

Lead oxide (PbO)  Ferric naphthenate
Lead naphthenate  Cobalt naphthenate
Lead hydroxide  Sodium hydroxide
Lead acetate  Zinc naphthenate
Lead octoate  Zinc oxide
Lead neodecanoate  Zinc neodecanoate Of these catalysts, zinc oxide, lead oxide, lead naphthenate and zinc naphthenate are particularly preferred.

By using metal ion catalysts as a treatment for or a process step in the manufacture of furan prepolymers, it is possible to significantly reduce the free formaldehyde content of such prepolymers (e.g. reduced from above 10% to below 27%).

Usually when a furan resin is employed, it is added together with furfuryl alcohol. A particularly suitable combination is a 50–50 mixture of furan resin and furfuryl alcohol.

The binder system contains from about 90 to about 20 percent by weight and preferably about 75 to about 25 percent of paraformaldehyde-ketone polymer; and from about 10 to about 80 percent by weight and preferably about 25 to about 75 percent by weight of the total of the furfuryl alcohol and/or furan resin; and/or the binder system contains a reaction product of about 90 to about 20% by weight and preferably about 75 to 20% by weight of a mixture of paraformaldehyde and ketone in the presence of about 10 to about 80 and preferably about 25 to about 75% by weight of furfuryl alcohol and/or furan polymer. The above weight percents are based upon the sum of the furfuryl alcohol and/or furan polymer and the mixture or polymer of paraformaldehyde and ketone.

It is most preferred to employ from about 70 to about 35 percent by weight of the mixture of paraformaldehyde and ketone, and from about 30 to about 65 percent by weight of total of furfuryl alcohol and/or furan resin.

The binding systems of the present invention are capable of room temperature cure which is used herein to include curing by chemical reaction without the need of external heating means. However, within the general description of room temperature cure, there are a number of different room temperature curing mechanisms which can be employed. For example, room temperature cure encompasses both "air cure" and "no bake." Normally, a room temperature cure is effected at room temperature of from about 60° F. to about 90° F. Binder systems possessing the ability to cure at room temperature can also be cured at elevated temperatures, but they can be distinguished from the heat curable binders because of the ability of the former to cure without external heating.

In order to promote the room temperature curing of the aggregate binder mixture, it is preferred to add an acid catalyst. The acid catalyst is employed in amounts from about 5 to about 45% by weight based upon the total weight of the binder system and preferably from about 20 to about 30% by weight based on the weight of the binder system. Examples of some suitable acid catalysts include strong inorganic acids such as hydrochloric acid and sulfuric acid, and strong organic acids including the aromatic sulfonic acids such as benzene sulfonic acid, benzene disulfonic acid, and phenol sulfonic acid, and the toluene sulfonic acid such as paratoluene sulfonic acid. In some instances mixtures of these acids are desirable.

The foundry mix can, optionally, contain other ingredients, such as iron oxide, ground flax fibers, food cereals, pitch, refractory flours, and the like.

The foundry mix can also include other foundry binders in amounts up to about 50% by weight of the ketone-formaldehyde polymer and generally about 5 to about 35% by weight of the ketone-formaldehyde polymer. Such other foundry binders include urea-formaldehyde polymers and phenolic polymers such as phenol-aldehyde polymers and urea modified phenol-aldehyde polymers and the like.

A particularly valuable additive to the binder compositions of the present invention is a silane having the general formula:

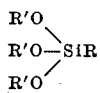

wherein R' is a hydrocarbon radical and preferably an alkyl radical of 1 to 6 carbon atoms and R is an alkyl radical, an alkoxy substituted alkyl radical or an alkyl-amino-substituted alkyl radical in which the alkyl groups have from 1 to 6 carbon atoms. The aforesaid silane when employed in concentrations of 0.1 to 2% based on the binder improves the adhesion of the binder to the foundry aggregate particle.

Examples of some suitable silanes include gamma-aminopropyltriethoxysilane [NH$_2$(CH$_2$)$_3$Si(OC$_2$H$_5$)$_3$] and trimethoxysilylpropethylenediamine

As presently contemplated, the binder compositions of the present invention can be supplied in one package and the acid catalyst supplied in a second package. Thus, the binders and catalyst of the present invention could ordinarily be sold, shipped, and stored as two separate packages. At the time of use, the contents of the two packages could be combined, with the foundry aggregate to form the foundry mix.

Methods of distributing the binder on the aggregate particles are well-known to those skilled in the art.

In the ordinary use of the compositions of the present invention to prepare foundry shapes the following steps are employed:

(1) forming a foundry mix containing an aggregate (e.g. sand) and the contents of the binder and catalysts;
(2) introducing the foundry mix into a mold or pattern to thereby obtain a green core;
(3) allowing the green core to remain in the mold or pattern for a time at least sufficient for the core to attain a minimum stripping strength (i.e., become self-supporting); and
(4) thereafter removing the green core from the mold or pattern and allowing it to cure at room temperature, thereby obtaining a hard, solid, cured core.

Optionally, the green core of the present invention can be stripped from the mold or pattern and baked to accelerate the cure.

The present invention makes it possible to prepare foundry shapes from binder systems without the necessity of employing nitrogen-containing compounds. Therefore, the problem of pin holes can be avoided.

Also the present invention makes it possible to obtain foundry shapes possessing properties almost as good as, and in some instances better than, the properties from binder systems prepared from furan resins as the sole binding material but at a greatly reduced cost. For instance, the mixture of the ketone-formaldehyde polymer and furfuryl alcohol and/or furan resins in the relative amounts described in the present invention cost considerably less than equal amounts of the furan resins per se. Also, the mixtures of about 50% by weight of the ketone-paraformaldehyde polymer and about 50% of the furfuryl alcohol and/or furan resin provide binder systems quite similar to those obtained from furan resins alone.

In addition, the binder systems of the present invention provide cores which result in metal castings having improved surface smoothness as compared to castings obtained from cores employing just the furan resin as the binder. Therefore, the present invention provides a good balance between economics and efficacy.

In addition, it has been observed that the use of the paraformaldehyde as the source of formaldehyde in the preparation of the acetone-formaldehyde polymers improves the tensile strength of the foundry shapes as compared to using aqueous formaldehyde solutions such as formalin as the formaldehyde source. The polymers prepared from paraformaldehyde result in foundry shapes having final tensile strengths of from about 30 to about 100 p.s.i. higher than those from polymers employing formalin as the source of formaldehyde. Accordingly, with the use of paraformaldehyde it is possible to use less binder than when formalin is employed without sacrificing important physical properties of the final foundry shape.

The present invention also provides good ratio of bench life to the time required for a core to reach an acceptable level of stripping strength. For instance, ratios below 1:3 and sometimes below 1:2 are achievable with the present invention.

In order to further understand the present invention the following non-limiting examples are provided. All parts are by weight unless the contrary is stated. In all of the examples, the foundry samples are cured by no-bake procedure at room temperature unless the contrary is stated.

Example 1

To a reaction vessel equipped with a stirrer, a thermometer, and a condenser, are added with agitation 116 parts of acetone, 132 parts of 91% paraformaldehyde, 100 parts of furfuryl alcohol, and 105 parts of phenol. To the above mixture are added 4 parts of a 50% aqueous solution of sodium hydroxide. The reaction mixture is heated. The reaction is continued for about 1 hour and 15 minutes with the temperature rising to a maximum of about 84° C. The reaction mixture is then distilled by heating to about 100° C. for about 1 hour whereby a total of 60 parts of volatile material is removed. 5.4 parts of a 30% by weight aqueous solution of phosphoric acid are added to neutralize the reaction product. The product is then vacuum distilled for about 10 minutes at about 73° C. and about 35–45 mm. of Hg. The vacuum is removed and the product is permitted to cool down to room temperature. 340 parts of product are obtained having a water tolerance of 25%.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane commercially available under the trade designation Silane A–1100 with 5 parts of furfuryl alcohol. The mixture is then agitated for 4 minutes.

The resulting foundry mix is formed into standard AFS tensile strength samples using the standard procedure. The tensile strength of the test bars is 90 p.s.i. after 2 hours, 235 p.s.i. after 4 hours, and 430 p.s.i. after 24 hours at room temperature. In addition, the composition has a work time of 12 minutes.

Example 2

To a reaction vessel equipped with a stirrer, thermometer, and a condenser, are added with agitation 145 parts of acetone, 113 parts of 91% paraformaldehyde, 100 parts of furfuryl alcohol and 72 parts of urea. To the above mixture are added 3 parts of a 50% aqueous solution of sodium hydroxide and 3 parts of phenol. The reaction mixture is heated to reflux. The reaction is continued for about 1 hour and 22 minutes with the temperature rising to a maximum of about 74° C. The reaction mixture is then distilled by heating to about 95° C. for about 1 hour and 10 minutes whereby a total of 62 parts of volatile material is removed. 4 parts of a 30% by weight aqueous solution of phosphoric acid are added to neutralize the reaction product. The product is then vacuum distilled at about 50° C. for about 5 minutes at about 35–45 mm. of Hg. The vacuum is removed and the product is permitted to cool down to room temperature. 334 parts of product are obtained.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane with 5 parts of furfuryl alcohol. The mixture is then agitated for 4 minutes.

The resulting foundry mix is formed into standard AFS tensile strength samples using the standard procedure. The tensile strength of the test bars is 86 p.s.i. after 2 hours, 161 p.s.i. after 4 hours, and 335 p.s.i. after 24 hours at room temperature. In addition, the composition has a work time of 20 minutes.

Example 3

To a reaction vessel equipped with a stirrer, thermometer, and a condenser are added with agitation 145 parts of acetone, 113 parts of 91% paraformaldehyde, 100 parts of furfuryl alcohol and 72 parts of phenol. To the above mixture are added 4 parts of a 50% aqueous solution of sodium hydroxide. The reaction mixture is heated. The reaction is continued for about 1 hour and 35 minutes with the temperature rising to a maximum of about 82° C. The reaction mixture is then distilled by heating to about 98° C. for about 1 hour whereby a total of 86 parts of volatile material is removed. 5.4 parts of a 30% by weight aqueous solution of phosphoric acid are added to neutralize the reaction product. The reaction product is then vacuum distilled for about 10 minutes at about 90° C. and 44 mm. of Hg. The vacuum is removed and the product is permitted to cool down to room temperature. 300 parts of product are obtained having a water dilutability of 50%.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane with 5 parts of furfuryl alcohol. The mixture is then agitated for 4 minutes.

The resulting foundry mix is formed into standard AFS tensile strength samples using the standard procedure. The tensile strength of the test bars is 70 p.s.i. after 2 hours, 148 p.s.i. after 4 hours, and 323 p.s.i. after 24 hours at room temperature. In addition, the composition has a work time of 26 minutes.

Example 4

To a reaction vessel equipped with a stirrer, thermometer, and a condenser, are added with stirring 145 parts of acetone, 113 parts of 91% paraformaldehyde, 100 parts of furfuryl alcohol, and 36 parts of phenol. To the above mixture are added 3 parts of a 50% aqueous solution of sodium hydroxide. The reaction mixture is heated. The reaction is continued for about 1 hour and 23 minutes with the temperature rising to a maximum of 75° C. The reaction mixture is then distilled by heating to about 98° C. for about 1 hour whereby a total of 84 parts of volatile material is removed. 4 parts of a 30% by weight aqueous solution of phosphoric acid are added to neutralize the product. The product is then vacuum distilled for about 10 minutes at about 80° C. at about 44 mm. of Hg. The vacuum is removed and the product is permitted to cool down to room temperature. 278 parts of product are obtained having a water dilutability of 50%.

1,000 parts of Wedron 5010 sand and 6 parts of a 65% by weight aqueous solution of paratoluene sulfonic acid are admixed for about 2 minutes. To this mixture are added 15 parts of the resin produced from above, and a solution of 0.03 part of silane A–1100 with 5 parts of furfuryl alcohol. The mixture is then agitated for 4 minutes.

The resulting foundry mix is formed into standard AFS tensile strength samples using the standard procedure. The tensile strength of the test bars is 69 p.s.i. after 2 hours, 117 p.s.i. after 4 hours, and 299 p.s.i. after 24 hours at room temperature. In addition, the composition has a work time of 30 minutes.

Example 5

To a reaction vessel equipped with a stirrer, thermometer, and a condenser, are added with stirring 116 parts of acetone, 132 parts of 91% paraformaldehyde, 100 parts of furfuryl alcohol, and 70 parts of phenol. To the above mixture are added 4 parts of a 50% aqueous solution of sodium hydroxide. The reaction mixture is heated. The reaction is continued for about 1 hour with the temperature rising to a maximum of 84° C. The reaction mixture is then distilled by heating to about 102° C. for about 1 hour and 20 minutes whereby a total of 70 parts of volatile material is removed. 5.4 parts of a 30% by weight aqueous solution of phosphoric acid are added to neutralize the product. The product is then vacuum distilled for about 10 minutes at about 72° C. at about 44 mm. of Hg. The vacuum is removed and the product is permitted to cool down to room temperature. 310 parts of product are obtained.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane with 5 parts of furfuryl alcohol. The mixture is then agitated for 4 minutes.

The resulting foundry mix is formed into standard AFS tensile strength samples using the standard procedure. The tensile strength of the test bars is 110 p.s.i. after 2 hours, 218 p.s.i. after 4 hours, and 338 p.s.i. after 24 hours at room temperature. In addition, the composition has a work time of 14 minutes.

Example 6

To a reaction vessel equipped with a stirrer, thermometer, and a condenser are added with agitation 116 parts of acetone, 132 parts of 91% paraformaldehyde, 100 parts of furfuryl alcohol, and 34.8 parts of phenol. To the above mixture are added 3 parts of a 50% aqueous solution of sodium hydroxide. The reaction mixture is heated. The reaction is continued for about 1 hour and 33 minutes with the temperature rising to a maximum of about 82° C. The reaction mixture is then distilled by heating to about 101° C. for about 1 hour and 25 minutes whereby a total of 58 parts of volatile material is removed. 4 parts of a 30% by weight aqueous solution of phosphoric acid are added to neutralize the product. The product is then vacuum distilled for about 15 minutes between 91 and 88° C. at about 44 mm. of Hg. The vacuum is removed and the product is permitted to cool down to room temperature. 290 parts of product are obtained.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane with 5 parts of furfuryl alcohol. The mixture is then agitated for 4 minutes.

The resulting foundry mix is formed into standard AFS tensile strength samples using the standard procedure. The tensile strength of the test bars is 70 p.s.i. after 2 hours, 129 p.s.i. after 4 hours, and 290 p.s.i. after 24 hours at room temperature. In addition, the composition has a work time of 24 minutes.

Example 7

To a reaction vessel equipped with a stirrer, thermometer, and a condenser are added with agitation 116 parts of acetone, 132 parts of 91% paraformaldehyde, 100 parts of furfuryl alcohol and 17.4 parts of phenol. To the above mixture are added 3 parts of a 50% aqueous solution of sodium hydroxide. The reaction mixture is heated. The reaction is continued for about 45 minutes with the temperature rising to a maximum of 82° C. The reaction mixture is then distilled by heating to about 83° C. for about 45 minutes whereby a total of about 36 parts of volatile material is removed. 4 parts of a 30% by weight aqueous solution of phosphoric acid are added to neutralize the reaction product. The product is then vacuum distilled for about 10 minutes between at about 60° C. at about 44 mm. of Hg. The vacuum is removed and the product is permitted to cool down to room temperature. 332 parts of product are obtained.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane with 5 parts of furfuryl alcohol. The mixture is then agitated for 4 minutes.

The resulting foundry mix is formed into standard AFS tensile strength samples using the standard procedure. The tensile strength of the test bars is 70 p.s.i. after 2 hours, 118 p.s.i. after 3 hours, and 176 p.s.i. after 24 hours at room temperature. In addition, the composition has a work time of 39 minutes.

Example 8

To a reaction vessel equipped with a stirrer, thermometer, and a condenser are added with agitation 116 parts of acetone, 132 parts of 91% paraformaldehyde and 100 parts of furfuryl alcohol. To the above mixture are added 2 parts of a 50% aqueous solution of sodium hydroxide and 2 parts of phenol. The reaction mixture is heated. The reaction is continued for about 1 hour with the temperature rising to a maximum of 78° C. 2.7 parts of a 30% by weight aqueous solution of phosphoric acid are added to neutralize the product. The product is then vacuum distilled for about 15 minutes between 70 and 60° C. at about 44 mm. of Hg. The vacuum is removed and the product is permitted to cool down to room temperature. 295 parts of product are obtained.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane with 5 parts of furfuryl alcohol. The mixture is then agitated for 4 minutes.

The resulting foundry mix is formed into standard AFS tensile strength samples using the standard procedure. The tensile strength of the test bars is 74 p.s.i. after 2 hours, 97 p.s.i. after 3 hours, and 166 p.s.i. after 24 hours. In addition, the composition has a work time of 35 minutes.

Example 9

To a reaction vessel equipped with a stirrer, thermometer, and a condenser are added with agitation 116 parts of acetone and 132 parts of 91% paraformaldehyde. To the above mixture are added 2 parts of a 50% aqueous solution of sodium hydroxide and 2 parts of phenol. The temperature rises to about 68° C. in 20 minutes due to the reaction exotherm. The temperature is maintained at 68° C. by heating for about 25 minutes. 100 parts of furfuryl alcohol are added while heating and the reaction is continued for about 10 minutes. The reaction mixture is then distilled by heating to about 112° C. for about 30 minutes whereby a total of 60 parts of volatile material is removed. 2.7 parts of a 30% by weight of aqueous solution of phosphoric acid are added to neutralize the reaction product. The product is cooled down to room temperature. 312 parts of product are obtained.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane with 5 parts of furfuryl alcohol. The mixture is then agitated for 4 minutes.

The resulting foundry mix is formed into standard AFS tensile strength samples using the standard procedure. The tensile strength of the test bars is 61 p.s.i. after 2 hours, 105 p.s.i. after 4 hours, and 260 p.s.i. after 24 hours at room temperature.

Example 10

To a reaction vessel equipped with a stirrer, thermometer, and a condenser are added with stirring 348 parts of acetone, 396 parts of 91% paraformaldehyde, and 315 parts of phenol. To the above mixture are added 12 parts of a 50% aqueous solution of sodium hydroxide and 10 parts of water. The reaction mixture is heated. The reaction is continued for about 2 hours and 10 minutes with the temperature rising to a maximum of 79° C. The reaction mixture is then distilled by heating to about 100° C. for about 35 minutes whereby a total of 205 parts of volatile material is removed. 16.2 parts of a 30% by weight aqueous solution of phosphoric acid are added to neutralize the product. The product is then vacuum distilled for about 10 minutes at about 100° C. at about 44 mm. of Hg. The vacuum is removed and the product is cooled down to room temperature. 855 parts of product are obtained.

1,000 parts of Wedron 5010 sand and 6 parts of a 65% by weight aqueous solution of paratoluene sulfonic acid are admixed for about 2 minutes. To this mixture are added 10 parts of the acetone-formaldehyde product prepared above and a solution of 0.03 part of gamma aminopropyltriethoxysilane with 10 parts of furfuryl alcohol. The mixture is then agitated for 4 minutes.

The resulting foundry mix is formed into standard AFS tensile strength samples using the standard procedure. The tensile strength of the test bars is 105 p.s.i. after 2 hours, and 370 p.s.i. after 24 hours. In addition, the composition has a work time of 25 minutes.

Example 10–A 100 parts of Wedron 5010 silica sand and 0.4 part of a 65% by weight of aqueous solution of aniline salt of paratoluene sulfonic acid are admixed for 2 minutes. To this mixture are added 1 part of the acetoneformaldehyde product prepared in Example 10 and a solution of .003 part of gamma aminopropyltriethoxysilane with 1 part of furfuryl alcohol. The mixture is then agitated for 4 minutes.

The resulting foundry mix is formed into standard AFS tensile strength samples using the standard procedure for hot box application at a cure temperature of about 425° F. The 30 second hot tensile strength (measured immediately out of the box) of the test bars is 54 p.s.i. and the 60 second hot tensile strength is 94 p.s.i. The 30 second cold tensile strength is 425 p.s.i. (measured after test samples cool to room temperature) and the 15 second cold tensile strength is 390.

Example 10–B

Example 10–A is repeated except that one part of a mixture of 50% furfuryl alcohol and 50% of a furan resin having a viscosity of 0.75 stokes, a pH of 8.10 and brown-red clear liquid commercially available under the trade designation Chem Rez 280 from Ashland Oil, Inc. is employed in place of 1 part of the furfuryl alcohol.

The foundry mix is formed into standard AFS tensile strength samples by the standard procedure for hot box application at a cure temperature of about 425° F. The 30 second hot tensile strength (measured immediately out of the box) of the test bars is 70 p.s.i. and the 60 second hot tensile strength is 90 p.s.i. The 60 second cold tensile strength is 522 p.s.i. The 30 second cold tensile strength (measured after test samples cool to room temperature) is 453 p.s.i. and the 15 second cold tensile strength is 380 p.s.i.

Example 11

To a reaction vessel equipped with a stirrer, thermometer, and a condenser are added with agitation 93 parts of acetone, 159 parts of 91% paraformaldehyde, 80 parts of furfuryl alcohol, and 99 parts of phenol. To the above mixture are added 4 parts of a 50% aqueous solution of sodium hydroxide. The reaction mixture is heated. The reaction is continued for about 1 hour and 35 minutes with the temperature rising to a maximum of about 87° C. The reaction mixture is then distilled by heating to about 97° C. for about 1 hour whereby a total of 40 parts of volatile material is removed. 5.4 parts of a 30% by weight aqueous solution of phosphoric acid are added to neutralize the reaction product. The product is then vacuum distilled for about 10 minutes at about 63° C. at 45 mm. of Hg. The vacuum is removed and the product is permitted to cool down to room temperature. 359 parts of product are obtained having a water dilutability of 100%.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane with 5 parts of furfuryl alcohol. The mixture is then agitated for 4 minutes.

The resulting foundry mix is formed into standard AFS tensile strength samples using the standard procedure. The tensile strength of the test bars is 169 p.s.i. after 2 hours, 250 p.s.i. after 4 hours, and 420 p.s.i. after 24 hours at room temperature. In addition, the composition has a work time of 11 minutes.

Example 12

To a reaction vessel equipped with a stirrer, thermometer, and a condenser are added with agitation 116 parts of acetone, and 132 parts of 91% paraformaldehyde. To the above mixture are added 2 parts of a 50% aqueous solution of sodium hydroxide and 2 parts of phenol. The temperature of the reaction mixture rises to a maximum of 69° C. in about 13 minutes due to the exotherm. The reaction is continued for another 40 minutes at which time 2.7 parts of a 30% by weight aqueous solution of phosphoric acid are added to neutralize the reaction product. The reaction mixture is then vacuum distilled for about 8 minutes between 67° and 62° C. at about 45 mm. of Hg. The vacuum is removed and the product is permitted to cool down to room temperature. 208 parts of product are obtained.

1,000 parts of Wedron 5010 sand and 6 parts of a 65% by weight aqueous solution of paratoluene sulfonic acid are admixed for about 2 minutes. To this mixture are added 10 parts of the acetone-formaldehyde product prepared above and a solution of 0.03 part of gamma aminopropyltriethoxysilane with 10 parts of furfuryl alcohol. The mixture is then agitated for 4 minutes.

The resulting foundry mix is formed into standard AFS tensile strength samples using the standard procedure. The tensile strength of the test bars is 65 p.s.i. after 2 hours, 105 p.s.i. after 4 hours, and 185 p.s.i. after 24 hours at room temperature. In addition, the composition has a work time of 56 minutes.

Example 13

To a reaction vessel equipped with a stirrer, thermometer, and a condenser are added with stirring 116 parts of acetone, 150 parts of furfuryl alcohol and 132 parts of 91% paraformaldehyde. To the above mixture are added 2 parts of a 50% aqueous solution of sodium hydroxide and 2 parts of phenol. The temperature of the reaction mixture rises to a maximum of 82° C. in about 25 minutes. The reaction is continued for another 7 minutes at which time another 132 parts of 91% paraformaldehyde are added, and the reaction mixture is heated. The reaction is continued for another 42 minutes with the temperature rising to a maximum of about 75° C. Another 132 parts of 91% paraformaldehyde are added and reaction is continued for another 23 minutes with the temperature rising to a maximum of about 75° C. 100 parts of furfuryl alcohol and 2 parts of a 50% aqueous solution of sodium hydroxide and 2 parts of phenol are added to the reaction mass. The reaction is continued for about another 1 hour and 10 minutes with the temperature rising to a maximum of 79° C. 5.4 parts of a 30% by weight of an aqueous solution of phosphoric acid are added to neutralize the reaction mass. The product is then vacuum distilled for about 15 minutes between 85 and 75° C. at 65 mm. of Hg. The vacuum is removed and the product is permitted to cool down to room temperature. 688 parts of product are obtained.

1,000 parts of Wedron 5010 sand and 6 parts of a 65% byl weight aqueous solution of paratoluene sulfonic acid are admixed for about 2 minutes. To this mixture are added 15 parts of the acetone-formaldehyde product prepared above and a solution of 0.03 part of gamma aminopropyltriethoxysilane with 5 parts of furfuryl alcohol. The mixture is then agitated for 4 minutes.

The resulting foundry mix is formed into standard AFS tensile strength samples using the standard procedure. The tensile strength of the test bars is 125 p.s.i. after 2 hours, 225 p.s.i. after 4 hours, and 335 p.s.i. after 24 hours at room temperature. In addition, the composition has a work time of 20 minutes.

Example 14

To a reaction vessel equipped with a stirrer, thermometer, and a condenser are added with agitation 116 parts of acetone and 198 parts of 91% paraformaldehyde. To the above mixture are added 2 parts of a 50% aqueous solution of sodium hydroxide and 2 parts of phenol. The temperature rises to a maximum of about 72° C. in about 20 minutes due to the reaction exotherm. The reaction is continued for another 45 minutes with the temperature being maintained around 68° C. by heating. 100 parts of furfuryl alcohol are added and the reaction mass is heated to about 120° C. The reaction is continued for about another 22 minutes. The reaction is then distilled by heating for 48 minutes to about 120° C. whereby a total of 50 parts of water is removed. 2.7 parts of a 30% by weight aqueous solution of phosphoric acid are added to neutralize the product. The product is permitted to cool down to room temperature. 385 parts of product are obtained.

1,000 parts of Wedron 5010 sand and 6 parts of a 65% by weight aqueous solution of paratoluene sulfonic acid are admixed for about 2 minutes. To this mixture are added 15 parts of the acetone-formaldehyde product prepared above and a solution of 0.03 part of gamma aminopropyl-triethoxysilane with 5 parts of furfuryl alcohol. The mixture is then agitated for 4 minutes.

The resulting foundry mix is formed into standard AFS tensile strength samples using the standard procedure. The tensile strength of the test bars is 70 p.s.i. after 2 hours and 110 p.s.i. after 4 hours at room temperature. In addition, the composition has a work time of 32 minutes.

Example 15

To a reaction vessel equipped with an agitator, thermometer, and reflux condenser are added with agitation 45.52 parts of acetone, and 2.94 parts of phenol. Then 25.3 parts of 91% flake paraformaldehyde are slowly added to the reaction vessel. The reaction vessel is heated to about 125° F. and then 0.35 part of sodium hydroxide are added while maintaining the temperature below the reflux temperature of acetone of 133° F. After about 45 minutes at which time the reaction exotherm is substantially complete, the reaction media is cooled to about 125° F. At this time, 25.30 parts of paraformaldehyde are slowly added to the reaction mass while maintaining the temperature below 130° F. The temperature is then permitted to rise to about 140° F. Another 0.35 part of sodium hydroxide are gradually added to the reaction mass, with the reflux temperature gradually rising to about 152° F. After about 1 hour, another 0.24 part of sodium hydroxide are added to the reaction. The reaction proceeds for about 2½ hours whereby product having a Gardner-Holdt viscosity of H and water dilutability of about 150% is obtained. About .47 part of 25% formic acid are added to the reaction mass to neutralize the alkaline catalyst. The temperature of the reaction mass is cooled to about 150° F. whereby vacuum of about 45 mm. of Hg is gradually applied to distill off the volatile matter until viscosity increases to V (Gardner-Holdt). The product is then cooled. 87 parts of product are obtained.

100 parts of Wedron 5010 sand and 0.4 part of a 65% by weight aqueous solution of phenol sulfonic acid are admixed for about 2 minutes. To this mixture are added 1 part of the acetone-formaldehyde product prepared above and a solution of 0.003 part of trimethoxysilylpropethylenediamine with 1 part of furfuryl alcohol. The mixture is then agitated for 4 minutes.

The resulting foundry mix is formed into standard AFS tensile strength samples using the standard procedure. The tensile strength of the test bars is 150 p.s.i. after 2 hours, 340 p.s.i. after 4 hours, and 335 p.s.i. after 24 hours at room temperature. In addition, the composition has a work time of 18 minutes and strip time of 30 minutes.

Example 16

Example 15 is repeated except that reaction product has a final viscosity of T–U. The tensile strength of the test bars is 226 p.s.i. after 2 hours, 340 p.s.i. after 4 hours and 300 p.s.i. after 24 hours at room temperature. In addition the composition has a work time of 17 minutes and a strip time of 25 minutes.

Example 17

Example 15 is repeated except that the reaction product has a final viscosity Y. The tensile strength of the test bars is 252 p.s.i. after 2 hours, 432 p.s.i. after 4 hours, and 288 p.s.i. after 24 hours at room temperature. In addition, the composition has a work time of 15 minutes and a strip time of 27 minutes.

What is claimed is:

1. Composition for the fabrication of foundry shapes which comprises:
   (A) a major amount of foundry aggregate; and
   (B) an effective bonding amount up to about 10% by weight based on the weight of the aggregate of a binder system selected form the group of
      (1) compositions containing about 90 to about 20% by weight of a reaction product of solid paraformaldehyde and a ketone in a mole ratio of paraformaldehyde to ketone of about 7:1 to about 1:1, said ketone being selected from the group of ketones of the following formula:

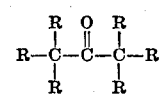

wherein each R individually is selected from the group of hydrogen, alkyl of from 1 to about 8 carbon atoms, aryl of from 6 to 14 carbon atoms, and cycloalkyl of 3 to 8 carbon atoms, provided that at least two R's are hydrogen; cyclohexanone, and cyclopentanone, and mixtures thereof, and about 10 to about 80% by weight of furfuryl alcohol and/or furan resin; and
      (2) reaction product of about 90 to about 20% by weight of a mixture of said paraformaldehyde and said ketone as defined above in a mole ratio of paraformaldehyde to ketone of about 7:1 to about 1:1, in the presence of about 10 to about 80% by weight of furfuryl alcohol and/or about 80% by weight of furfuryl alcohol and/or furan resin.

2. The composition of claim 1 wherein said foundry aggregate is sand.

3. The composition of claim 1 wherein the binder system is present in an amount of about 0.25 to about 5% by weight based on weight of aggregate.

4. The composition of claim 1 which further contains a catalytic amount of an acid catalyst.

5. The composition of claim 1 wherein the mole ratio of paraformaldehyde to ketone is about 1.2:1 to about 3.0:1.

6. The composition of claim 1 wherein said ketone is acetone.

7. The composition of claim 1 wherein the binder system is obtained from about 75 to about 25% by weight of paraformaldehyde and said ketone from about 25% to about 75% by weight of total of furfuryl alcohol and/or furan resin.

8. The composition of claim 1 wherein the acetone-paraformaldehyde is an alkali catalyzed acetoneparformaldehyde polymer.

9. The composition of claim 8 wherein the alkali is sodium phenate.

10. The composition of claim 1 which further includes 0.1 to 2% based on the binder system of a silane having the general formula:

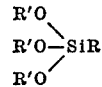

wherein R' is a hydrocarbon radical and R is an alkyl radical, an alkoxy substituted alkyl radical or an alkyl-amino-substituted alkyl radical in which the alkyl groups have from 1 to 6 carbon atoms.

References Cited
UNITED STATES PATENTS

| | | | |
|---|---|---|---|
| 3,725,333 | 4/1973 | Adkins et al. | 260—Dig. 40 X |
| 3,734,936 | 5/1973 | Brown et al. | 260—37 R X |
| 3,745,139 | 7/1973 | Kachur et al. | 260—Dig. 40 X |

LEWIS I. JACOBS, Primary Examiner

U.S. Cl. X.R.

260—37 R, Dig. 40, 998.18

UNITED STATES PATENT OFFICE
CERTIFICATE OF CORRECTION

Patent No. 3,806,491          Dated April 23, 1974

Inventor(s) John J. Gardikes and Young D. Kim

It is certified that error appears in the above-identified patent and that said Letters Patent are hereby corrected as shown below:

Column 1, line 54, "extenral" should read --external--.
Column 2, lines 32 and 33, "cyclohexane" should read --cyclohexanone--.
Column 5, line 33, "holding" should read --holing--.
Column 6, line 68, "27%" should read --2%--.
Column 7, line 5, before "20%" second occurrence, insert --about--.
Column 8, line 5, delete the last closing parenthesis before the closing bracket.
Column 13, line 30, "acetoneformaldehyde" should read --acetone-formaldehyde--.
Column 15, line 2, "by1" should read --by--.
Column 16, line 61, delete "about 80% by weight of furfuryl alcohol and/or"
Column 17, line 7, for "acetoneparaform-" read --acetone-paraform- --.

Signed and sealed this 17th day of December 1974.

(SEAL)
Attest:

McCOY M. GIBSON JR.
Attesting Officer

C. MARSHALL DANN
Commissioner of Patents